April 5, 1960 M. A. LERMAN 2,931,246
MEANS FOR INCREASING LEVERAGE IN MOTOR VEHICLE BRAKE PEDALS
Filed April 26, 1957
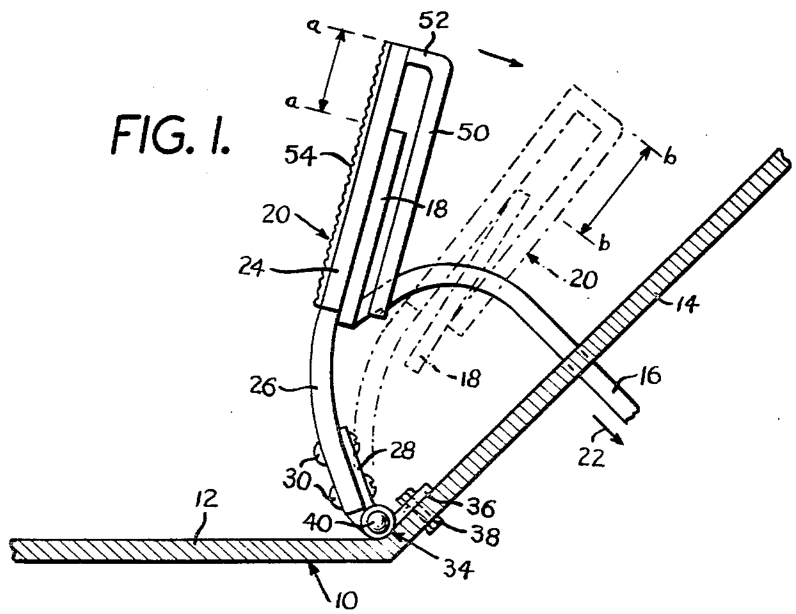
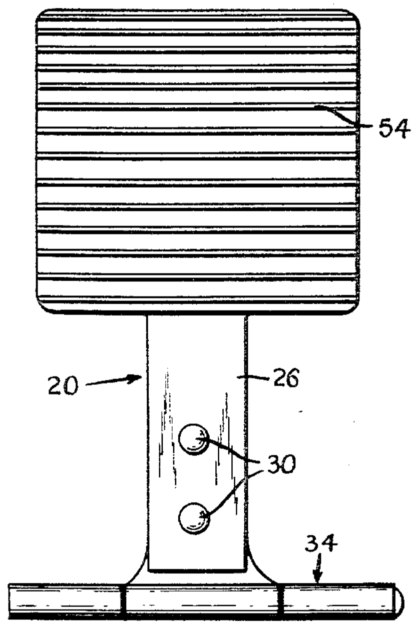
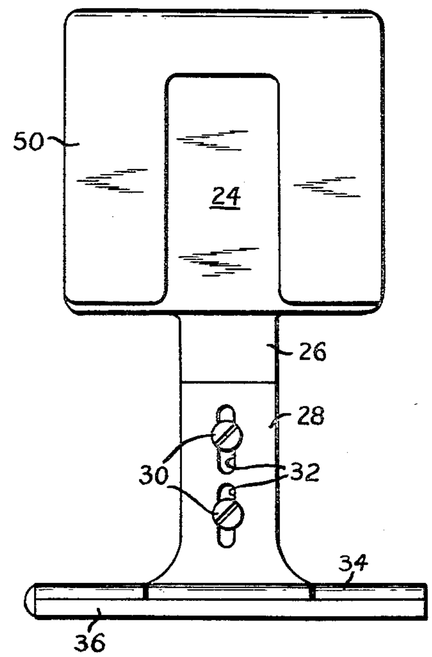
INVENTOR
MONROE ARNOLD LERMAN
BY Samuel [signature]
ATTORNEY.

2,931,246
Patented Apr. 5, 1960

2,931,246

MEANS FOR INCREASING LEVERAGE IN MOTOR VEHICLE BRAKE PEDALS

Monroe Arnold Lerman, Sunnyside, N.Y.

Application April 26, 1957, Serial No. 655,379

5 Claims. (Cl. 74—516)

This invention relates to means for increasing leverage in motor vehicle brake pedals.

The object of this invention is the provision of an attachment which may be mounted on conventional brake pedals in motor vehicles to increase or enhance the leverage or mechanical advantage thereof. Nothing is changed in the brake pedal itself or in any aspect of the braking system. The attachment is merely placed upon the brake pedal while being supported on a fixed part of the motor vehicle, such as the floor or floor board adjacent the brake pedal.

More specifically, the present device comprises an auxiliary pedal which is pivotally supported at one end on a fixed part of the motor vehicle and which bears at its opposite end against the brake pedal, generally covering the same. It will be understood that the rubber pad is removed from the brake pedal to permit the auxiliary pedal to bear directly against the brake pedal. This is necessary to conserve space and to reduce the frictional coefficient between the two pedals.

To apply the brakes, the auxiliary pedal is depressed and since it rests against the brake pedal, this causes the latter to be depressed in conventional manner. The auxiliary pedal is depressed in conventional manner, that is, by placing one's foot against it and pressing downwardly.

The pivotal axis of the auxiliary pedal is so situated relative to the path of movement of the brake pedal that, as the brake pedal is depressed to actuate the brakes, it moves closer to said pivotal axis. By the same token, the free end of the auxiliary pedal moves outwardly from the brake pedal, as said brake pedal is depressed, to increase its lever arm relative to said brake pedal.

Stated differently, at the beginning of the braking stroke when the brake pedal is at its highest position, the brake pedal is situated adjacent the free end of the auxiliary pedal and far removed from the pivotal axis of said auxiliary pedal. There is a progressive movement of the brake pedal away from the free end of the auxiliary pedal and toward said pivotal axis as the brake pedal is pressed downwardly in the direction of its lowermost position. At said lowermost position, the brake pedal is relatively close to the pivotal axis and it has moved a considerable distance below the free end of the auxiliary pedal. Since the foot of the person applying the brakes is situated adjacent the free end of the auxiliary pedal, this will provide increased leverage against the brake pedal and consequently it will result in a stronger braking action with no additional effort on the part of the driver. The driver's foot will, of course, travel a slightly longer distance on the auxiliary pedal than it normally would on the brake pedal proper in order to provide this enhanced mechanical advantage.

An important object of this invention is the adjustability of the auxiliary pedal which adapts it to the brake pedals of many different types and models of motor vehicles. For example, it may be mounted upon the brake pedals of many different makes and models of passenger automobiles and also many different makes and models of commercial vehicles such as trucks and buses.

The present invention is applicable to brake pedals mounted in any conventional manner. For example, some brake pedals are pivotally mounted and others travel a straight path. Some are suspended from above while others are supported from below. The present invention applies to all of these arrangements but for purposes of illustration and clarification the invention is shown in the drawing solely in connection with a brake pedal supported from below and mounted for rectilinear movement.

The invention is illustrated in the accompanying drawing in which:

Fig. 1 is a side view of an auxiliary pedal made in accordance with a preferred form of this invention and showing it mounted on a conventional brake pedal in a motor vehicle.

Fig. 2 is a front view of said auxiliary pedal.

Fig. 3 is a back view thereof.

Fig. 1 shows in fragmentary vertical section a floor board 10 of a motor vehicle, said floor board having a horizontal component 12 and an inclined component 14 projecting forwardly and upwardly from said horizontal component. Projecting through the inclined floor board 14 is an arm 16 of a conventional brake pedal 18. It will be observed that there is no rubber pad on said brake pedal since the presence of such pad would provide excessive space between said brake pedal and the auxiliary pedal 20 herein described and claimed and further for the reason that such rubber pad would provide a relatively high coefficient of friction between the two pedals which would oppose the relative slidable movement between them.

It will be understood that brake pedal 18 and its supporting arm 16 travel a fixed arcuate path, as witness arrow 22 in Fig. 1. It is also to be understood from the drawing that arm 16 is supported in conventional manner below the floor board.

Auxiliary pedal 20 includes a plate element 24 which is mounted at the upper end of a supporting arm 26. Said supporting arm is adjustably secured to a hinge element 28 by means of bolts 30. In this connection it will be noted that hinge element 28 is provided with longitudinally extending elongated slots 32 to receive bolts 30 and when said bolts are loosened it is possible to move the arm 26 longitudinally of itself in order to adjust the distance between the upper end of plate element 24 and the pivotal axis of hinge 34 of which plate 28 is an element.

The other hinge element 36 is secured by means of screws or bolts 38 to the floor 10. As shown in the drawing, the pintle 40 is situated along the line of juncture between the horizontal and inclined components 12 and 14 respectively of the floor. This is the preferred location and the hinge element 36 is supported on the inclined component 14. It will be understood, however, that while this location is preferred, in many installations it would be necessary to locate the hinge at a different place relative to the path of movement of the brake pedal. It is essential, as has above been stated, that the lever arm represented by the auxiliary pedal increase as the brake pedal is depressed and that will determine the location of the hinge.

Secured to the back of plate 24, in spaced relation thereto, is a bifurcated arm 50. This bifurcated arm is supported at its upper end from the upper end of plate 24 by means of a cross-piece or bridge 52. Arm 50 is bifurcated so as to provide a space between its two portions for the arm 16 of the brake pedal. The function of said bifurcated arm is to hold the plate 24 on the brake pedal 18 while permitting limited relative movement between them. On the face of plate 24 is a rubber pad 54 and it is upon said rubber pad that the driver's foot is placed in order to operate the brakes.

The method of operation of this device will now be described. When it is desired to apply the brakes, the driver places his foot upon the rubber pad 54 of the auxiliary pedal and he then presses downwardly and forwardly in precisely the same manner as he would a conventional brake pedal. Both auxiliary pedal and brake pedal are thereby moved from their solid line positions shown in Fig. 1 to their interrupted line positions therein shown, the latter being merely illustrative of the various depressed positions which the two pedals may occupy.

It will now be noted that a distance *a—a* separates the top of the auxiliary pedal from the top of the brake pedal when they are both in their inoperative positions indicated by the solid lines in Fig. 1. Even in this position the auxiliary pedal provides a leverage advantage over the brake pedal to the extent of the upwardly projecting portion of the auxiliary pedal corresponding to the distance *a—a*. This added leverage may be increased by simply adjusting the arm 26 on the hinge element 28 in order to extend the effective length of the auxiliary pedal, that is, the length from the pivotal axis of the hinge 34 to the upper end of plate 24.

When the two pedals are depressed to a position such as is illustrated by the interrupted lines in Fig. 1, the distance between the upper ends of the two pedals now increases to that indicated by *b—b*. The mechanical advantage of the auxiliary pedal over the brake pedal is thereby increased pro tanto, that is, to the extent that distance *b—b* exceeds distance *a—a*.

The foregoing is illustrative of a preferred form of this invention and it will be understood that this form may be modified and other forms may be provided within the broad spirit of the invention and the broad scope of the claims. For example, the bifurcated arm 50 performs the function of holding the auxiliary pedal in engagement with the brake pedal. Other means may be utilized to perform this function, such as a conventional torsion spring incorporated into the hinge so as to urge the auxiliary pedal in clockwise direction as viewed in Fig. 1 of the drawing, thereby holding the auxiliary pedal in engagement with the brake pedal.

I claim:

1. Braking means for motor vehicles, comprising a brake pedal which actuates the braking system and an auxiliary pedal which operates the brake pedal, said brake and auxiliary pedals being mounted for movement in fixed arcuate paths, said auxiliary pedal being pivotally supported at one end on a fixed part of the motor vehicle and bearing at its free end against a portion of said brake pedal, whereby foot pressure against the auxiliary pedal to depress the same depresses the brake pedal and actuates the braking system, the pivotal axis of said auxiliary pedal being so situated relative to the path of movement of the brake pedal that said pivotal axis is approached by said portion of the brake pedal when both pedals are depressed to actuate the braking system, thereby lengthening the effective lever arm of the auxiliary pedal relative to the brake pedal.

2. Braking means in accordance with claim 1, wherein the fixed part of the motor vehicle on which the auxiliary pedal is pivotally supported is the floor board of said motor vehicle adjacent the brake pedal, the pivotal means being a hinge which is secured at one end to said floor board and which is secured at its opposite end to said auxiliary pedal.

3. Braking means in accordance with claim 1, wherein the auxiliary pedal includes an adjustable supporting arm which may be adjusted in length to change the effective length of said auxiliary pedal from its pivotal axis to its free end.

4. Braking means in accordance with claim 1, wherein a retaining element is provided to hold the auxiliary pedal in engagement with the brake pedal while permitting such relative movement between them as takes place when they are simultaneously depressed to actuate the braking system.

5. Braking means in accordance with claim 4, wherein the retaining element is an arm which is secured at one end to the back of the auxiliary pedal in spaced relation thereto to accommodate the brake pedal between them.

References Cited in the file of this patent

UNITED STATES PATENTS

| | | |
|---|---|---|
| 1,821,588 | Thorp et al. | Sept. 1, 1931 |
| 2,242,145 | Rushfeldt | May 13, 1941 |

FOREIGN PATENTS

| | | |
|---|---|---|
| 711,373 | France | Sept. 8, 1931 |